Jan. 3, 1967  V. L. JAMES ETAL  3,295,555
VARIABLE THROAT JET ENGINE AIR INTAKE
Filed Jan. 15, 1965  4 Sheets-Sheet 1

INVENTORS
VARNELL L. JAMES
JAMES R. MOOREHEAD
BY ELLING TJONNELAND

Robert W. Beach

ATTORNEY

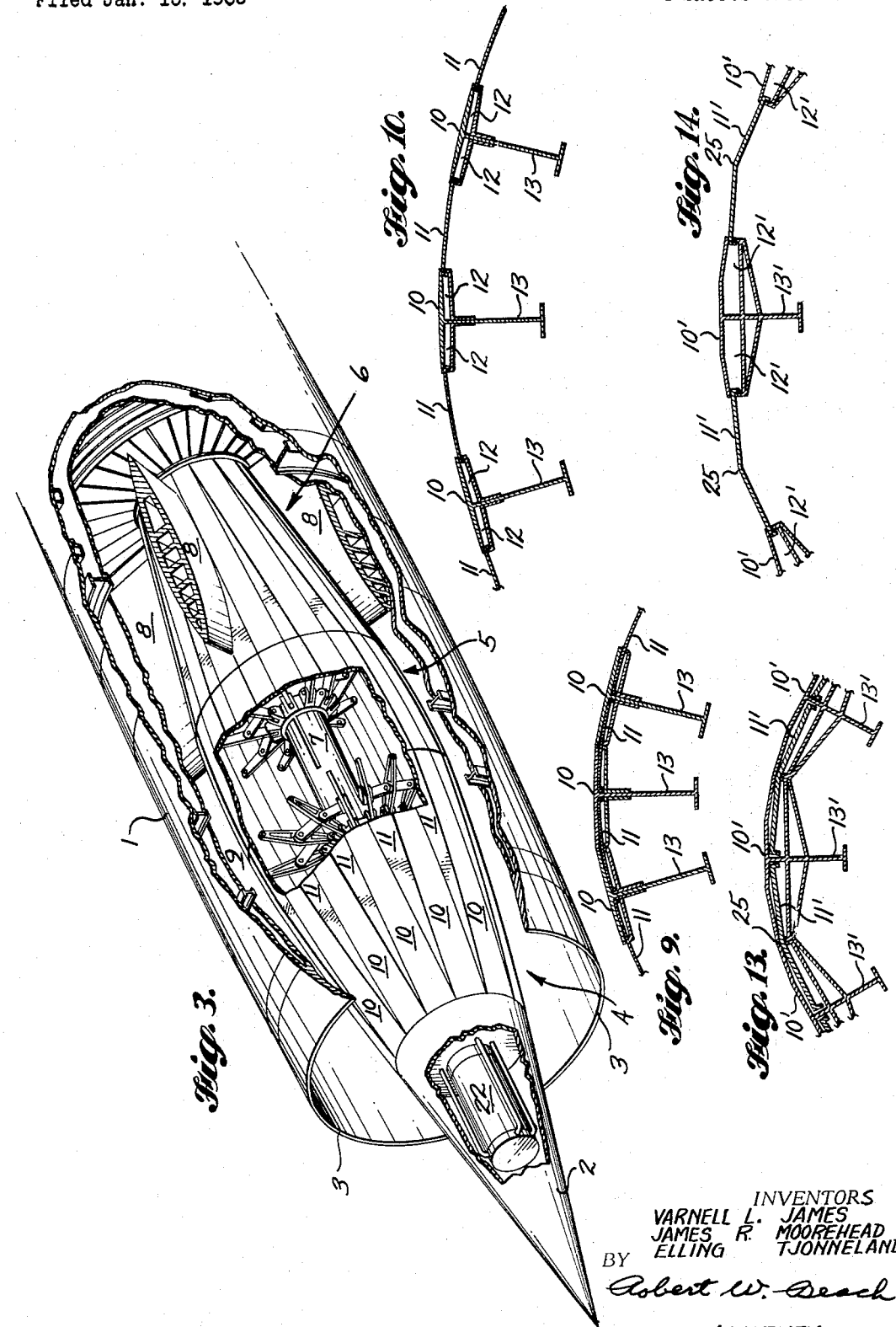

Jan. 3, 1967  V. L. JAMES ETAL  3,295,555
VARIABLE THROAT JET ENGINE AIR INTAKE
Filed Jan. 15, 1965  4 Sheets-Sheet 3
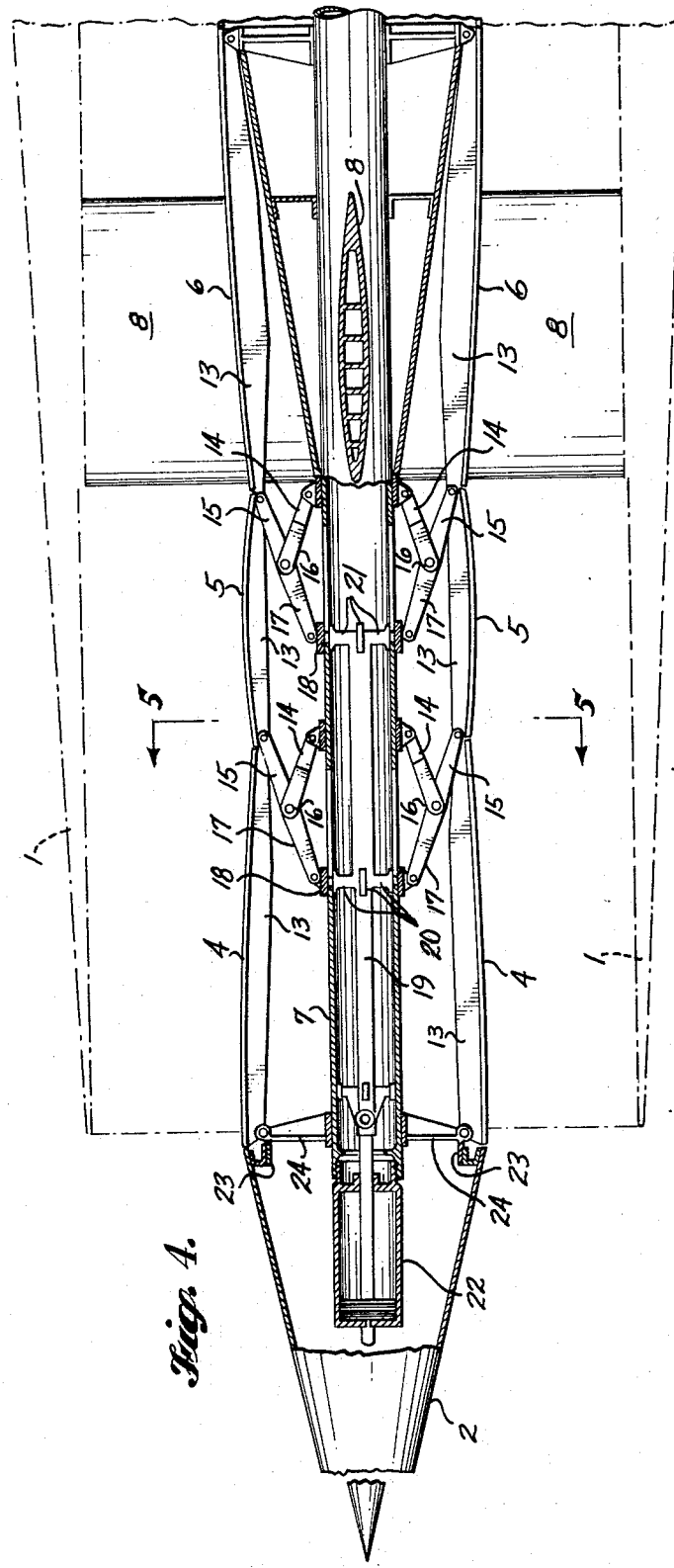
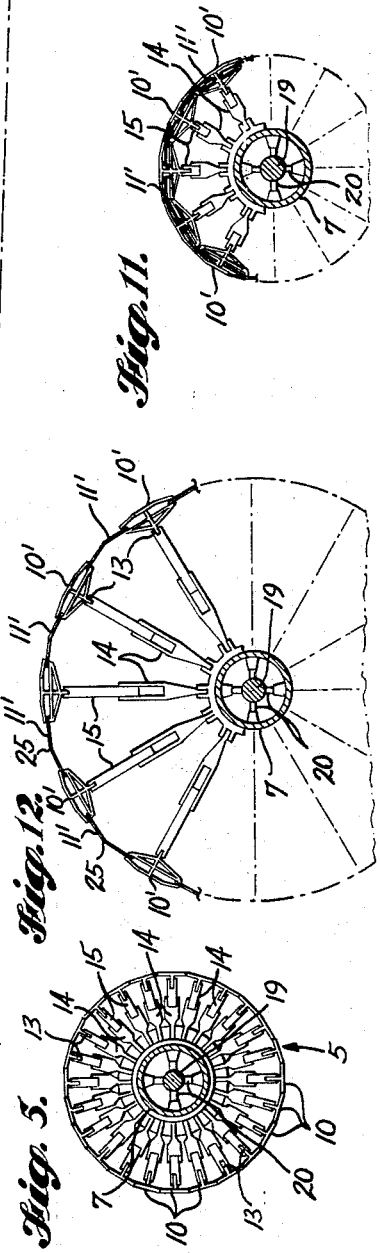
INVENTORS
VARNELL L. JAMES
JAMES R. MOOREHEAD
BY ELLING TJONNELAND
*Robert W. Beach*
ATTORNEY

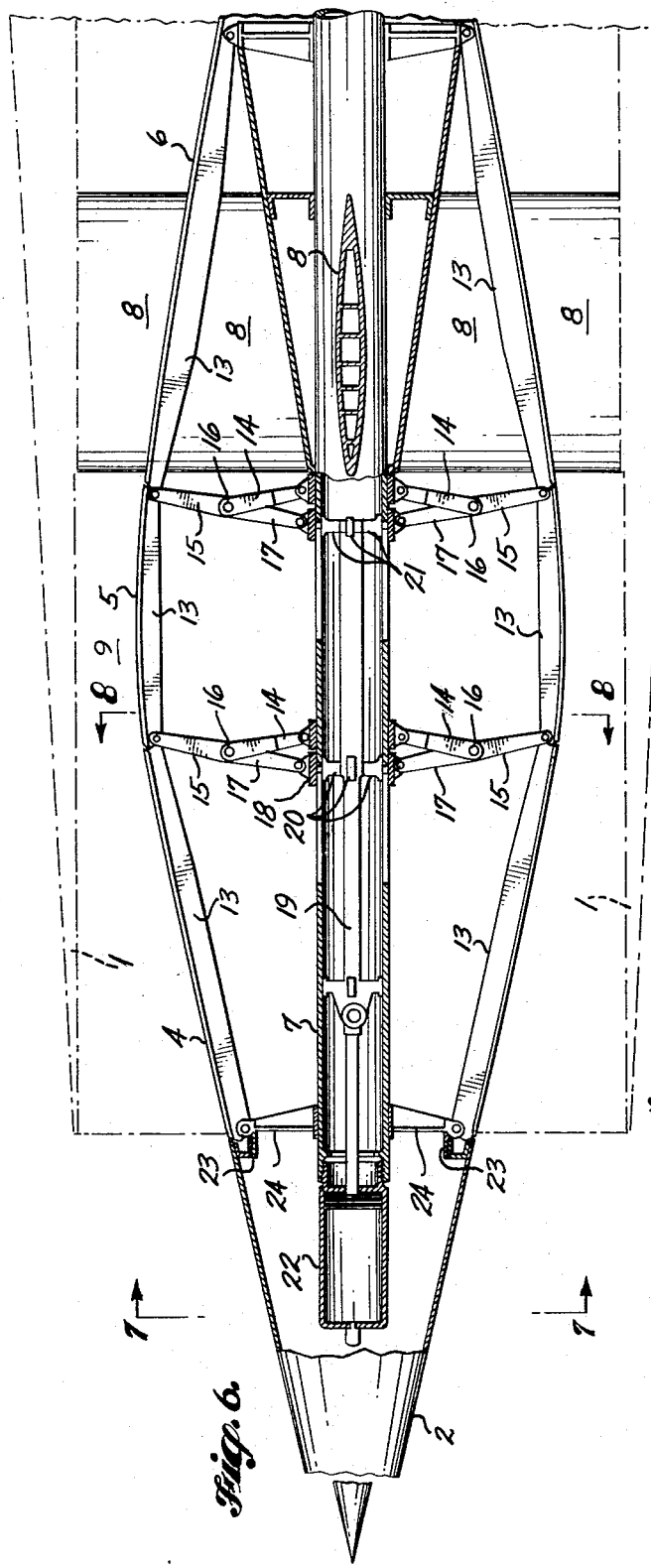

United States Patent Office 3,295,555
Patented Jan. 3, 1967

3,295,555
VARIABLE THROAT JET ENGINE AIR INTAKE
Varnell L. James, Kent, James R. Moorehead, Bellevue, and Elling Tjonneland, Seattle, Wash., assignors to The Boeing Company, a corporation of Delaware
Filed Jan. 15, 1965, Ser. No. 425,837
7 Claims. (Cl. 138—45)

This invention relates to a jet engine air intake of annular shape between an external tubular cowl and an elongated core within the cowl which is laterally expandable to vary the cross-sectional area of the annular air intake opening.

It is a principal object of the present invention to provide a jet engine annular air intake, the throat opening through which is variable in a manner to provide a stable flow of air through the opening which is substantially uniform at all locations circumferentially of the opening at supersonic velocities, as well as at subsonic velocities. In accomplishing this result it is an object to provide an annular throat the radial width of which can be varied, but in which the radial width of the throat will be uniform at all circumferential locations in any given plane perpendicular to the direction of air flow through the opening.

A further object is to provide such a jet engine annular air intake the throat area of which can be varied to accomplish maximum pressure recovery at supersonic flow speeds through the air intake.

An additional object is to enable the throat of such air intake to be choked when the airplane is flying at low speeds and the power demand is small so that compressor noise will be minimized under such conditions, which will occur, for example, during the approach of the airplane for landing.

It is also an object to provide a construction for the core of the annular air intake opening which will enable it to be expanded and contracted laterally although the wall of the core is sealed sufficiently effectively so that only a very small leakage from the annular air intake opening into the interior of the core can occur. Moreover, such core structure is light and rugged.

A further object is to provide actuating mechanism for adjusting the size of the core which can be operated easily and quickly and which will be reliable in operation.

Such objects can be accomplished by providing an external tubular cowl which is stationary and has within it an elongated core of generally lenticular longitudinal section, the central portion of which can be expanded from a minimum cross-sectional area providing an annular passage of substantially uniform cross section throughout its length for airflow at subsonic speeds to a condition in which the throat of the annular passage is choked. The shell of the core is composed of edge-overlapping gores and strakes which are relatively slidable to reduce the degree of edge overlap as the core is expanded toward flow-choking position. All the gores can be moved simultaneously by conjoint movement of toggle joints connecting the inner sides of control strakes and a central mounting tube extending axially through the core.

FIGURE 3 is a top perspective of the jet engine air intake showing the core in expanded condition, parts being broken away to reveal internal structure.

FIGURE 4 is a longitudinal section through the expandable core shown in its contracted condition, the cowl being illustrated in phantom, and FIGURE 5 is a transverse section through such core taken on line 5—5 of FIGURE 4.

FIGURE 6 is a longitudinal section through the core in fully expanded condition, the cowl being shown in phantom, FIGURE 7 is a transverse section through such core taken on line 7—7 of FIGURE 6, and FIGURE 8 is a transverse section through the core on line 8—8 of FIGURE 6.

FIGURE 9 is an enlarged detail showing a portion of the cowl shell in transverse section when fully contracted and FIGURE 10 is a similar view of such portion of the shell when the core is fully expanded.

FIGURE 11 is a transverse section through a modified type of core structure taken on line 5—5 of FIGURE 4 and FIGURE 12 is a similar transverse section taken on line 8—8 of FIGURE 6. FIGURE 13 is an enlarged fragment of a portion of the shell of such core in transverse section shown fully contracted and FIGURE 14 is a similar view of such shell portion shown in fully expanded condition.

Figure 1:
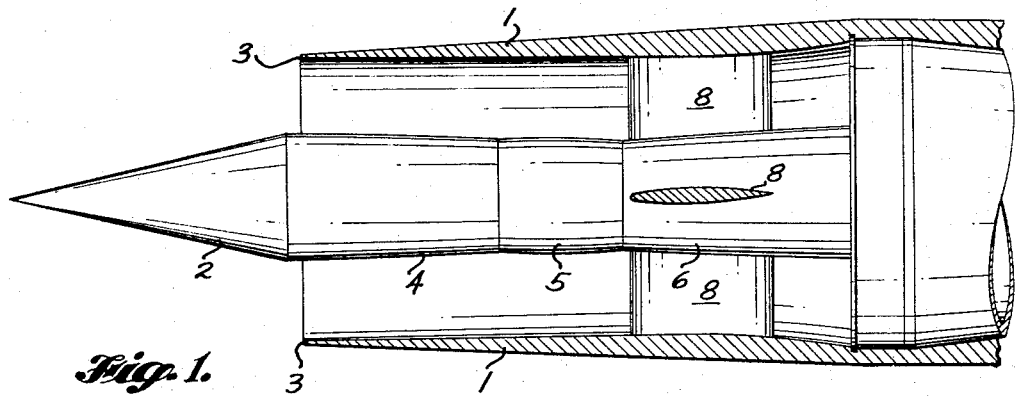
FIGURE 1 is a longitudinal section through the cowl with the core shown in elevation in contracted condition and FIGURE 2 is a similar view with the core in fully expanded condition.

As has been stated above the invention of the present application is applicable to inlet ducts for jet engines. While it is perhaps more useful for application to air inlet ducts of turbojet engines, it could also be used for ramjet engines or pulsejet engines, all of which engines are intended to be embraced within the general designation of "jet engines." In the drawings the inlet itself has been illustrated, but the engine is not shown. In each instance, however, the air inlet will be through a tubular cowl 1, which is shown as being of circular cross section, but it could be elliptical cross section, for example, or could be of sector shape, such as of semicircular or semielliptical cross section.

Figure 2:
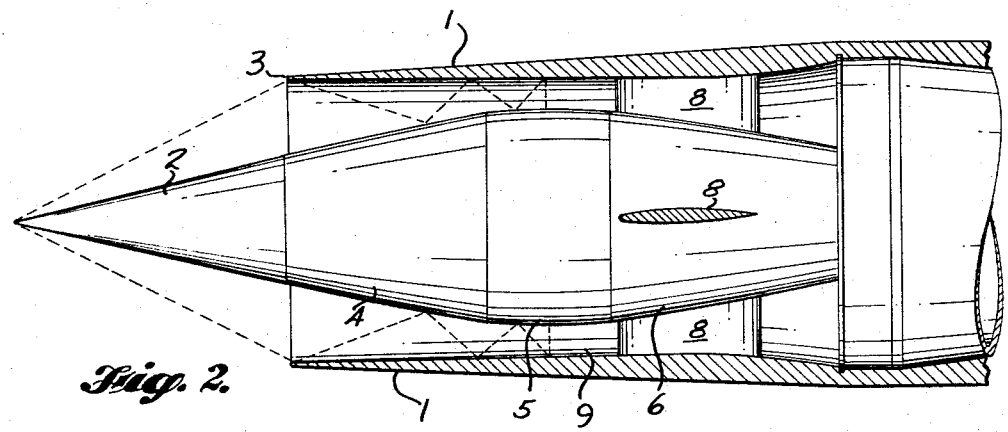

As shown in the general longitudinal sections of FIGURES 1 and 2, the present invention is directed to the regulation of the opening through the cowl 1 by the provision of a central core extending axially through the cowl. Such core is laterally expandable from the fully-contracted condition shown in FIGURE 1 to the fully-expanded condition shown in FIGURE 2. The core is composed of a substantially stationary nose cone 2 which is forward of the lip 3 of cowl 1 and the cross-sectional shape and size of which cannot be altered, and a portion aft of such nose cone, which is laterally expandable. The laterally expandable portion of the core is shown as including three sections, namely, a forward section 4, a central section 5 and an aft section 6. This entire core structure is supported from a central stationary mounting tube 7, shown in FIGURES 4 and 6, which is supported by a plurality of radial struts 8 extending inward from the cowl 1. Such mounting tube and the core project forwardly and rearwardly from the struts in cantilever fashion.

When the jet engine is operating under power at low airplane speeds, that is, at subsonic speeds, and particularly when the power output requirements are high, such as during takeoff of the airplane, it is desirable for the air inlet opening of the duct to be maximum. Under such circumstances the core should be fully contracted, as shown in FIGURE 1, so that the cross-sectional area of the annular opening through the cowl 1 is maximum and substantially constant throughout the length of the cowl in which the core is located. On the other hand, when the airplane is flying at rather high supersonic speeds, such as Mach 1.5 to 3, it is desirable for the core to assume the fully-expanded form shown in FIGURE 2 forming a throat 9 as designated in that figure. The purpose of such an air inlet duct configuration is to reduce the speed of the air entering the cowl to approximately sonic speed and recover air pressure. At the downstream side of the throat 9 the air speed will be subsonic.

A comparison of FIGURES 1 and 2 shows that the expansion of the core from the condition of FIGURE 1 to that of FIGURE 2 requires differential lateral movement of different parts of the core shell so that, when the core is in its expanded condition, it will taper fore and aft from the throat 9. In general, the longitudinal cross section of the core in its expanded condition including the nose cone 2 is generally lenticular. Provision of such a core constructed so that there is no relative movement between any portion of the core and the cowl 1 longitudinally of the cowl insures that, when the core is expanded to any degree, the location of the throat 9 will always be at a definite predetermined location lengthwise of the cowl. A constant relationship can thus always be maintained between the location of the air inlet duct throat and relief valves and/ or bypass doors which may be provided in the cowl aft of the throat.

The structural mechanism shown in the drawings is designed particularly for cores of circular cross section, but the same general principles could, for the most part, be employed for cores of elliptical cross section. Such cores would be used within cowls of corresponding elliptical cross-sectional shape so that in any laterally expanded condition of the core the width of the passage between the core and the cowl would be uniform in any plane perpendicular to the axis of the core. Also it is not meant to imply that the passage between the core and the cowl must necessarily be annular, for the cowl and the core could, for example, be of semicircular cross section or semielliptical in cross section, or these cooperating parts could be of any other desired arcuate extent as long as the arcuate extent of the core and of the cowl were the same and the width of opening between the core and the cowl was the same in any plane perpendicular to the axis of the core and cowl in whatever position of radial adjustment the core might be.

The most important part of the present invention is the construction of the core within the cowl 1. Consequently, the cowl is shown in broken lines in FIGURES 4 and 6. The construction of the core shell is shown best in FIGURE 3 as being composed of edge-overlapping strips extending lengthwise of the core, shown as alternate strakes 10 of substantially uniform width and gores 11. The degree of edge overlap between such strakes and gores varies in accordance with the degree of lateral expansion of the core from the condition shown in FIGURE 4 toward that shown in FIGURE 6.

In order to provide an effective edge seal between the strakes 10 and gores 11, it is desirable for the opposite edges of the strakes to have in them deep grooves, as shown best in FIGURE 10, into which the edge portions of the gores 11 can telescope when the core shell is contracted toward the condition of FIGURE 9. The overlapping edges of the strakes and gores can have small interfering edge flanges which can be moved into engagement to limit the relative sliding movement of the strakes and gores so that they cannot become disconnected. The gores 11 can then float between the strakes during lateral expansion movement of the core shell and such movement can be effected simply by moving the strakes 10. Particularly when the core shell is in the expanded condition of FIGURE 6 and the airplane is traveling at high speed, it is important for the shell to be stiffened to resist inward deflection of portions of it by air pressure. For this purpose stringers 13 are provided along the inner sides of the strakes 10, as shown in FIGURES 4 and 6 and in detail in FIGURE 10 which extend over substantially the entire length of the strakes to rigidify them so as to maintain substantially constant axial profile shape in all radially adjusted positions. Each combination of the strakes and stringers thus forms a T bar which may, if desired, have opposite inner flange so that each element is of modified I-beam construction in such case.

As is evident from FIGURE 6, the greatest lateral expansion of the core shell occurs in the central section 5 when the core is expanded from the condition of FIGURE 4 and less expansion occurs in the forward section 4 and aft section 6. The amount of overlap provided for the strip edges must be sufficient to enable the strips of section 5 to move into the position of FIGURE 6 without the edges separating. While, as stated above, the strakes 10 preferably are of uniform width throughout their lengths and while the gores 11 also could be of uniform width throughout their lengths, this is not necessary because, as shown in FIGURE 3, a considerably greater width of such gores is exposed between the strakes 10 in the central section 5 when the core shell is expanded than in the forward section 4 and the aft section 6.

For effecting expansion and contraction of the core shell it is necessary to provide actuating mechanism which will not only produce the desired movement of the shell sections, but which also will support the shell firmly against inward pressure in all adjusted positions. Such actuating mechanism should effect movement of the shell quickly between the contracted position of FIGURE 4 and the expanded position of FIGURE 6. As has been mentioned above, the shell is supported from the central fixed mounting tube 7 shown in FIGURES 4 and 6, and the actuating mechanism should be associated with this mounting tube. A type of actuating mechanism which is effective for expanding and contracting the core shell is composed of two sets of toggle joints and push-pull links to operate them. One set of toggle joints is connected to the shell at the break between the forward section 4 and the central section 5 and the other set is connected to the shell at the break between the central section 5 and the aft section 6.

Each toggle joint includes an inner link 14 having its inner end mounted by a pivot fixed in position on the mounting tube 7 and an outer link 15 having its outer end pivoted to a break point in the core shell. The outer pivots of the outer links 15 are disposed in the same plane perpendicular to the axis of mounting tube 7 as would pass through the axes of the pivots mounting the inner ends of inner links 14. A pivot 16 connects the links 14 and 15 of each toggle joint at locations on such respective links which are spaced equidistantly along such links from their mounting pivots. In addition a push-pull link 17 connects the common joint of the toggle joint to a slide 18 which is moved along the mounting tube 7 by a thrust rod 19 arranged axially within the mounting tube 7. Such thrust rod carries a forward spider 20 connected to the slides 18 of the toggle joint set connected to the junction between the forward shell section 4 and the central shell section 5 and a spider 21 connected to the slides 18 of the toggle joint set connected to the break between the central shell section 5 and the aft shell section 6.

The thrust rod 19 can be reciprocated to expand the core shell by various types of actuators, such as the pressure fluid piston and cylinder jack 22. Such jack could be either pneumatic or hydraulic. While for some types of operation it may be sufficient for the jack 22 to be of the single-acting type which can act to force the thrust rod 19 to the right, as seen in FIGURE 4, relying upon the air pressure pressing inward on the core shell to move the thrust rod 19 to the left by the pressure acting on the shell of air passing through the air intake passage, it is preferred that the jack be of the double-acting type so that positive positioning control can be facilitated. Also, while in some instances or with some types of construction a pneumatic jack might be usable, much more positive control over the actuation of the shell-expanding mechanism can be accomplished if the jack is of the hydraulic type rather than the pneumatic type. Alternatively, an antifriction screw and nut actuator could be used instead of the fluid-pressure jack to reciprocate thrust rod 19.

The nose cone 2 is supported directly from the mounting tube 7 by a threaded ring 23 carried by radial struts 24 projecting outward from such tube. The base of the nose cone is simply threaded onto such ring. As the thrust rod 19 is moved to the right from the position shown in FIGURE 4, the push-pull links 17 will expand the toggle joints of both sets to expand the core shell from the condition shown in FIGURES 4 and 5 toward the condition shown in FIGURES 6, 7 and 8. Expansion of the core shell over the full range of movement will effect some alteration in length of the core shell, which either can be compensated for at the break points at opposite ends of the central shell section 5, or compensation for such lengthwise movement can be made either at the forward end of the forward section 4 or at the aft end of the aft section 6, or some length variation provision can be made at some or all of these locations. Such length variation will be small.

As shown in FIGURES 5 and 8, a toggle joint is provided to connect each stringer 13 to the mounting tube 7. Each T-bar 10, 12, 13 will, therefore, be moved radially outward and inward as the core shell is expanded and contracted. Each such toggle joint acts as a strut resisting inward deformation of the area of the core shell tributary to each respective toggle joint. Great resistance to the inward pressure of the air on the shell is thus provided. It may, however, be compatible with the provision of adequate strength for the number of toggle joints in each set to be less than illustrated in FIGURES 5 and 8. FIGURES 13 and 14 illustrate an alternative type of shell construction which would be feasible and yet which would reduce drastically, such as from 24 to 12, the number of toggle joints and stringers 13 at any selected cross-sectional location.

In the alternative type of construction shown in FIGURES 11, 12, 13 and 14, not only would the number of stringers 13' be half as great as the number of stringers 13 used in the construction shown in FIGURES 4 to 10 inclusive, but such alternative construction also would include only half as many strakes 10'. The strakes 10', and also the floating gores 11' connecting them, would be approximately twice as wide as the corresponding strakes 10 and gores 11 of the construction shown in FIGURES 4 to 10. The arcuate angle between the stringers 13' would be twice as great as the angle between adjacent stringers 13. If the strakes 10' were essentially flat, it would be desirable to form each of the floating gores 11' with a central ridge 25. The dihedral angle thus formed between the opposite edge portions of each gore would compensate for the greater arcuate angle between adjacent stringers 13'. The portions of each gore at opposite sides of the ridge 25 would then be substantially coplanar with the deep grooves provided in the respectively adjacent flanges of the T bars 10', 13'. Such ridge 25 has a stiffening effect which rigidifies the gore 11' lengthwise to maintain a substantially constant axial profile in all radially adjusted positions despite the greater width of such gores.

Whichever type of core shell construction is used, the overlapping portions of the strakes 10 will be pressed tightly against the outer surfaces of the edge portions of the gores 11 so that the leakage of air from the air intake passage through the cowl into the interior of the core will be very slight. Moreover, the seal between the strakes and the floating gores connecting them will be substantially equally effective in all expanded and contracted conditions of the shell. By connecting all the toggle joints to the single thrust rod 19 for actuation by its reciprocation, conjoint lateral movement of all the strakes will be assured so that the variation in width of the throat between the core shell and the cowl will be uniform at all locations circumferentially of the air intake passage. Such conjoint movement also will insure that no gaps between adjacent strips of the shell can occur unless one or more of the toggle joints should break, which is very unlikely.

In operation the core shell will be in the contracted condition shown in FIGURES 1, 4 and 5 during takeoff of the airplane and its ascent at subsonic speeds so as to afford maximum supply of air through the intake passage to the jet engine. Supplemental air may be admitted through bypass doors in the cowl located aft of the central core section 5. As the speed of the airplane exceeds Mach 1 by a predetermined amount, fluid under pressure can be supplied to the jack 22 to move its piston and thrust rod 19 toward the right for expanding the core shell. Such control operation can be effected by suitable velocity sensors or static pressure sensors within the cowl 1 which will effect operation of suitable control mechanism, or manual means can be provided for controlling the supply of fluid under pressure to the jack 22. In either case, the jack will be operated to expand the core shell progressively toward the condition of FIGURES 6, 7 and 8 as the airplane speed increases until the core shell has been expanded fully to the condition of FIGURES 6, 7 and 8 when the airplane has reached cruising speed.

When the core shell is in the expanded condition of FIGURES 2 and 6 during cruising of the airplane at supersonic speeds, the shock wave produced by the nose cone will have a sufficiently small angle so that it extends inside the lip 3 of the cowl. The shock wave front will be reflected back and forth as the wave progresses through the forward part of the arcuate or annular air intake passage which tapers rearwardly to the throat 9. As the shock wave reverberates between the interior of the cowl and the core shell, the angle of reflection will become progressively nearer to perpendicularity to the axis of the core until, at the throat, a normal shock wave occurs and the velocity of the air has decreased to sonic velocity. During such transition pressure is recovered so as to enable maximum flow of air through the air intake passage. At the throat and rearwardly of it the speed of airflow will be subsonic.

Under the conditions of climbing flight at subsonic speeds the power requirements ordinarily will be more than fifty percent of the power available from the engine and the core will be in contracted condition. If the power requirements are less than fifty percent of the power available from the engine, it may be desirable for the core to be in its condition of maximum expansion shown in FIGURE 6 in order to suppress engine noise. For example, shortly after takeoff, and with the core in contracted condition, it may be possible to reduce the rate of climb at subsonic speeds by use of less than one-half the available power, in which case the engine noise can be reduced by expanding the core to choke the airflow through the intake passage at the throat. This expedient is particularly effective when very low engine power is required, for example during the approach for a landing at low speed, such as Mach 0.3. In case it should be necessary for the airplane to resume level flight instead of completing the landing, when power in excess of fifty percent of the available power would be required, or when the engine speed is increased immediately after touchdown to reduce the ground speed of the airplane, the core can be contracted to increase promptly the cross-sectional area of the air inlet duct. Such contraction of the core could be effected either in response to control mechanism sensing engine power requirements, or power lever setting, or can be accomplished in response to manual control by the pilot.

We claim as our invention:
1. In a jet engine, an arcuate cowl providing within it an inlet duct for flow of air therethrough to the jet engine, and a core within said cowl including elongated edge-overlapping strips having their lengths extending axially of said core and forming a shell for said core with an external cross-sectional shape similar to the internal cross-sectional shape of said cowl, and defining with said cowl an air inlet passage of arcuate cross section and means effecting substantially radial movement of said strips for expanding said core laterally to vary the width of such arcuate passage, at least some of said strips having stiffening stringers projecting inward from their inner sides and extending lengthwise of said strips over substantially their entire lengths for rigidifying said strips to maintain a substantially constant axial profile in all radially adjusted positions thereof.

2. The jet engine structure defined in claim 1, in which strips having stiffening stringers are of T bar cross section and the oppositely projecting flanges of said T bars have edge grooves respectively opening oppositely, receiving therein edge portions of adjacent strips.

3. In a jet engine, an arcuate cowl provided within it an inlet duct for flow of air therethrough to the jet engine, and a core within said cowl including elongated edge-overlapping strips having their lengths extending axially of said core and forming a shell for said core with an external cross sectional shape similar to the internal cross sectional shape of said cowl, defining with said cowl an air inlet passage of arcuate cross section and means effecting movement of said strips generally radially of said cowl to vary the width of such arcuate passage, alternate strips being centrally ridged to dispose their opposite edge portions at a dihedral angle for rigidifying said strips to maintain a substantially constant axial profile in all radially adjusted positions thereof.

4. In a jet engine, an arcuate cowl providing within it an inlet duct for flow of air therethrough to the jet engine, and a core within said cowl including elongated edge-overlapping strips having their lengths extending axially of said core and forming a shell for said core with an external cross-sectional shape similar to the internal cross-sectional shape of said cowl, and defining with said cowl an air inlet passage of arcuate cross section, at least some of said strips having stiffening stringers extending lengthwise thereof, and actuating means connected to said stringers for exerting a force thereon to move said strips having said stiffening stringers substantially radially of said cowl for effecting expansion of said core to vary the width of such arcuate passage.

5. The jet engine structure defined in claim 4, in which the actuating means includes a lengthwise reciprocable rod and a plurality of radially disposed toggle joints connecting said rod and the stringers.

6. The jet engine structure defined in claim 5, a stationary axially disposed tube in which the reciprocable rod reciprocates, the toggle joints are connected between said tube and the stringers, and push-pull links connecting the reciprocable rod and the toggle joints.

7. The jet engine structure defined in claim 5, and a fluid-pressure jack received within the core and connected to the reciprocable rod for effecting reciprocation thereof.

References Cited by the Examiner
UNITED STATES PATENTS

| | | | |
|---|---|---|---|
| 2,763,426 | 9/1956 | Erwin | 60—35.6 |
| 3,069,842 | 12/1962 | Price | 60—35.6 |
| 3,199,810 | 8/1965 | Stroud | 60—35.6 |

MARK NEWMAN, *Primary Examiner.*

RALPH D. BLAKESLEE, *Examiner.*